Jan. 3, 1950     D. R. PUTT     2,493,028
INSTRUMENT FOR TESTING TACHOMETERS AND SPEEDOMETERS
Filed July 16, 1947
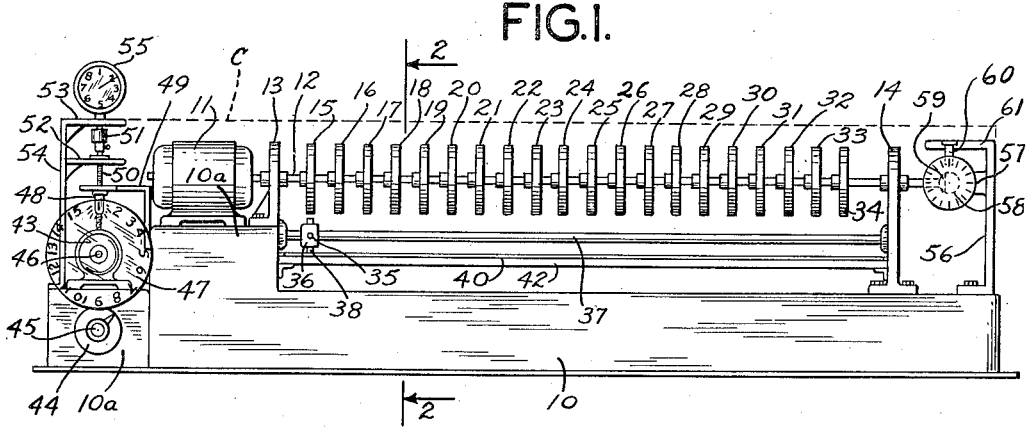
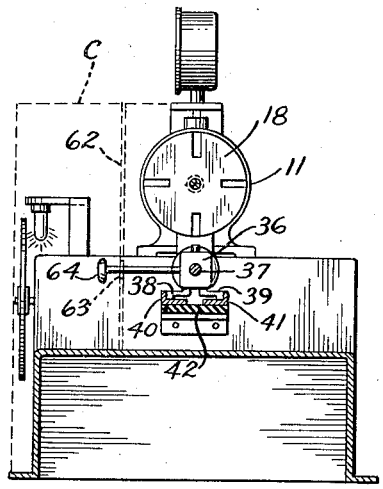
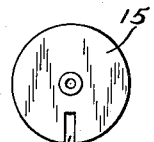
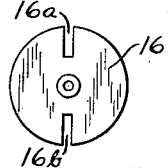
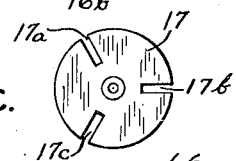
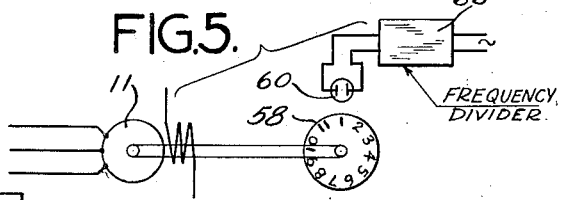
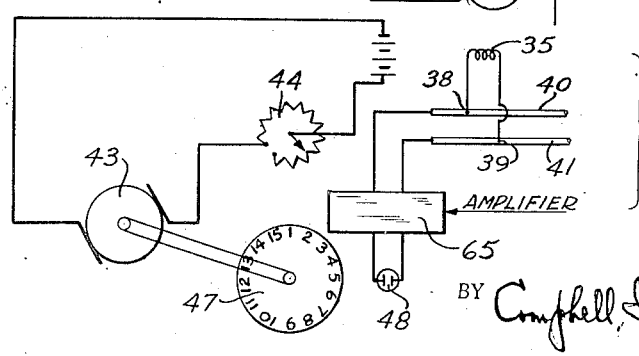
INVENTOR.
DONALD R. PUTT
BY
ATTORNEYS.

Patented Jan. 3, 1950

2,493,028

UNITED STATES PATENT OFFICE 2,493,028

INSTRUMENT FOR TESTING TACHOMETERS AND SPEEDOMETERS

Donald R. Putt, Jersey City, N. J.

Application July 16, 1947, Serial No. 761,209

5 Claims. (Cl. 73—2)

This invention relates to testing devices and it relates particularly to instruments for testing tachometers and speedometers.

Instruments have been devised heretofore for the testing of speedometers and tachometers, but these devices usually are quite complicated, involving complex electronic circuits and elaborate mechanical gear shifts for attaining the proper speeds for checking and testing the speedometers or tachometers.

An object of this invention is to provide a simplified form of testing instrument by means of which the accuracy of a tachometer or speedometer can be easily determined.

Another object of the invention is to provide a testing instrument including a simplified electrical circuit and a simple assembly of mechanical elements for testing the accuracy of the tachometers, speedometers and the like.

Other objects of the invention will become apparent from the following disclosure of a typical form of the device embodying the present invention.

In accordance with the present invention, I have provided an instrument which is characterized by the provision of a series of timing elements driven by a constant speed electric motor, these elements being constructed and arranged so that when a pick-up coil is brought adjacent to them, a current of predetermined frequency is generated or induced in the coil. This current is passed through an amplifier to energize a tube, such as for example, a neon tube to cause it to flash or flicker at the frequency produced in the coil. The tube is located behind a transparent disc driven by a variable speed motor. The speed of the motor can be adjusted so that when the disc appears to remain stationary because of the flashing of the tube, the speed of this variable speed motor corresponds to a predetermined frequency of the current. This variable speed motor is arranged to drive the speedometer or tachometer, and the instrument is calibrated so that the frequency generated by the constant speed driven elements corresponds to a predetermined number of revolutions per minute indicated on the tachometer or miles per hour indicated on the speedometer. The number of elements for generating the impulses in the coil can be varied, depending upon the range of the tachometer or speedometer, and each of these driven elements produces in the coil a different frequency. Therefore, by providing a suitable scale adjacent the adjustable coil, the number of revolutions per minute or the speed corresponding to the location of the coil can be read directly from the scale and compared with the indication on the tachometer or speedometer.

The device may further be provided with a mechanism for indicating whether the constant speed motor is operating at its proper speed. This mechanism may consist of a transparent disc connected to the constant speed motor and provided with suitable indicia thereon which are illuminated by another tube energized at a fixed, known frequency. If the testing motor is operating at its proper synchronous speed, the disc in front of the second tube will appear to remain stationary.

The above-described apparatus requires a relatively simple electronic circuit to produce the desired results, and the other equipment is reduced to a minimum commensurate with the accuracy required.

For a better understanding of the present invention, reference may be had to the accompanying drawing, in which:

Figure 1 is a view in side elevation of a typical form of testing instrument embodying the present invention with the casing for the device illustrated in dotted lines;

Figure 2 is a view in section on line 2—2 of Figure 1;

Figures 3a, 3b and 3c are views of different forms of pulse-generating or timing elements of the testing instrument; and Figure 4 is a schematic wiring diagram of a portion of the electrical circuit of the instrument including a frequency divider and synchronous motor with means for indicating synchronism thereof.

Figure 5 is a schematic wiring diagram of the remaining portion of the electrical circuit not shown in Figure 4.

The form of the testing instrument chosen for purposes of illustration may include a suitable base member 10 of hollow construction for housing the electrical circuit elements of the device hereinafter described. Near the left-hand end of the casing or base 10 is an elevated platform portion 10a, upon which is mounted a constant speed synchronous motor 11 which may be driven by alternating current so that it operates at a predetermined speed, such as for example, 100 R. P. M. The motor 11 is connected to a shaft 12 which is mounted in suitable bearing supports 13 and 14 projecting upwardly from the base member 10.

The shaft 12, as illustrated, carries a series of coaxial, spaced apart discs 15, 16, 17, 18, 19, 20, 21, 22, 23, 24, 25, 26, 27, 28, 29, 30, 31, 32, 33 and 34. Each of these discs may be formed of magnetic material, and each is provided with one or more slots therein. As shown in Figure 3a, the disc 15 is provided with one slot 15a, the next adjacent disc 16 is provided with two slots 16a and 16b, and the disc 17 is provided with three slots: 17a, 17b and 17c. Each of the successive discs 18 to 34 is provided with one more slot than the preceding disc so that the last disc 34 is provided with twenty slots. If desired, the discs may be formed of non-magnetic material and bar magnets may be inserted in the slots.

The discs 15 to 34 are used for generating electrical impulses in a coil member 35 which is disposed adjacent the row of discs 15 to 34. The coil 35 is mounted in a suitable casing 36 which is supported on a rod 37 extending lengthwise between the bearing supports 13 and 14. The opposite terminals of the coil 35 are connected with the contacts 38 and 39 which engage the commutator bars 40 and 41, respectively, which are mounted on an insulated bar 42 extending between the upright 14 and the casing portion 10a. When the coil 35 is positioned adjacent to or below one of the rotating discs 15 to 34, electrical impulses are induced therein.

The device further includes at its left-hand end a sub-casing 10a, upon which is mounted a variable speed motor 43 driven by a suitable source of electrical energy and the speed of which is controlled by means of a rheostat 44 having a knob 45 disposed at the front of the casing 10a. The motor 43 is provided with a shaft 46, on which is mounted a transparent disc 47 having a plurality of indicia thereon, around its periphery. The peripheral zone of the disc 47 is disposed in front of a gas glow tube, such as for example, a neon tube 48 which is mounted on a bracket 49 extending upwardly from the casing 10. The opposite end of the motor shaft 46 is connected to a flexible shaft 50 having a rotary chuck 51 in its upper end mounted rotatably between the arms 52 and 53 of the bracket 54 which extends upwardly from the casing 42. The upper arm 53 is provided with an opening through which the drive shaft of a tachometer or speedometer 55 can be inserted into engagement with the chuck 51, so that the tachometer or speedometer 55 is driven at the speed of the motor 43.

At the opposite end of the casing 10 is a bracket 56 having an arm 57 thereon for supporting a second transparent disc member 58 thereon. The disc 58 is driven from the shaft 12 and at the same speed by means of suitable gearing 59. This disc 58 is disposed in front of a glow tube 60 which is mounted on an arm 61 of the bracket 56.

The entire operating mechanism described above may be housed in a suitable casing C, shown generally in dotted lines, of any desired shape which extends around and masks the edges of the discs 47 and 58 so that the light from the tubes 48 and 60 must pass through the discs. Also, the casing or cover C may have a portion 62 extending downwardly in front of, and covering, the discs 15 to 34 and the coil 35. The casing may be provided with a slot 63 through which a manipulating knob 64 extends from the casing 36 of the coil. Thus, as the knob is moved along the slot 63, the coil can be selectively positioned below, or adjacent to the periphery of, any one of the discs 15 to 34. The casing front 62 may be provided with a scale, not shown, for indicating the frequency of the current generated in the coil 35, or a speed rating in miles or revolutions per minute.

The electrical circuit of the system is disclosed more particularly in Figure 4 of the drawings. As indicated above, the coil 35 is energized by one of the discs 15 to 34 beneath which it is located, and the current generated in the coil 35 is transmitted through the contacts 38 and 39 to the commutator bars 40 and 41. The commutator bars are connected to an amplifier 65 which energizes the glow tube 48 so that it flashes at a frequency corresponding to the frequency of the current induced in the coil 35.

When the transparent disc 47 is driven by the motor 43 at a speed corresponding to the frequency of the current generated in the coil 35, any number directly in front of the tube 48 will remain stationary, thereby indicating that the flexible shaft 50 and the tachometer or speedometer 55 connected thereto are driven at a speed corresponding to the frequency produced in the coil 35. If the motor 43 is driven slower or faster than this frequency, the numbers on the disc 47 will appear to move, thereby indicating that adjustment of the speed of the motor 43, by means of the rheostat 44, is necessary. Therefore, the rheostat 44 may be adjusted in one direction or the other until the disc 47 appears to become stationary.

Assuming that the coil 35 is adjacent the disc 15 and a tachometer 55 is connected with the motor 43, the motor 11 is set into operation and the tube 48 is energized. When the motor 43 is set into operation at its lowest speed, the numbers on the disc 47 may appear to move. The lowest speed of the motor should be slightly less than that corresponding to the lowest frequency produced by the disc 15. This arrangement is desirable to avoid any possibility of the motor 43 being driven at a speed corresponding to a multiple of the tube frequency and, therefore, producing an inaccurate indication. The resistance in the rheostat is then reduced until the disc 47 appears to be stationary. A reading then can be taken of the tachometer and compared with the setting of the coil to determine the accuracy of the tachometer. The coil 35 then can be moved below the next disc 16, and the resistance of the motor circuit 43 then reduced until the disc 47 appears to become stationary, and another reading of the tachometer in comparison with the setting of the coil 35 can be made. This operation may be repeated throughout the entire range of the scale of the tachometer or speedometer 55.

In order that any failure of the motor 11 to operate at synchronous speed will be known, the tube 60 may be energized from a suitable source of alternating current through a frequency divider 66 of conventional type. If the motor 11 is set to operate at 100 R. P. M., the frequency divider would be constructed to divide the line frequency of 60 cycles by 36, which would cause the lamp 60 to flash at a frequency of 100 per minute. If the motor 11 is maintaining synchronism with the lamp 60, the disc 58 will appear to remain stationary. If the motor 11 is not synchronous with the line, the disc 58 will appear to rotate. If desired, the lamp 60 may be energized by an amplifier under the control of a tuning fork or other fixed frequency device which provides a check on the line frequency as well as the operation of the motor 11.

The above-described device is accurate in operation and is a simple and efficient instrument for determining the accuracy of tachometers, speedometers and the like. It will be understood, of course, that the instrument is susceptible to considerable variation and modification, for example, in the arrangement of the discs 15 to 34 and the pick-up coil 35.

Thus, for example, the discs may be formed of non-metallic material and may have small bar magnets mounted in the slots of the discs. Or, if desired, the discs may be formed of non-permeable metal and an electro-magnet may be arranged on the opposite side of the disc from the coil, but carried with the coil, so that the disc acts to shield the coil from the magnet except when a slot passes between the magnet and the coil.

Therefore, it will be understood that the form of the invention described above is illustrative of the invention and should not be considered as limiting the scope of the following claims.

I claim:

1. A testing instrument for speed indicating devices comprising a constant speed motor, a plurality of elements connected to and driven by said motor, a coil adjacent to said elements and movable selectively adjacent to any of said elements, means associated with each of said elements for generating electrical impulses in said coil, said means differing in number in each of said elements whereby currents of different frequency may be generated in said coil, a glow tube, means connecting said coil to said tube to cause the latter to flash at the frequency of the current generated in said coil, a second variable speed motor, means for connecting the speed indicating device to be tested to said second motor, a disk member driven by said second motor and disposed adjacent to said tube to be illuminated thereby, and means for varying the speed of said second motor to synchronize it with the frequency of the current generated by said coil.

2. A testing device for speed indicating devices comprising a constant speed motor, a plurality of coaxial spaced apart disks rotated by said motor, a coil movably mounted adjacent to said disks and movable into positions adjacent to the periphery of any of said disks, magnetic means associated with said disks for generating electrical impulses in said coil as said disks are rotated, each disk differing from the other disks in the number of impulses generated in said coil per revolution, a tube electrically connected to said coil and controlled thereby to flash at the frequency of the current generated in said coil, a variable speed motor for driving the speed indicating device to be tested, a disk having indicia thereon rotated by said variable speed motor said indicia being disposed in front of said tube to be illuminated thereby, and means for varying the speed of said variable speed motor to synchronize the speed thereof with the flashing of said tube.

3. A testing device for speed-responsive measuring instruments comprising a constant speed motor, a plurality of coaxial, magnetic disks rotated by said motor, substantially radial slots in the peripheries of said disks, each disk having a different number of slots therein, a coil supported adjacent to said disks and movable adjacent to the periphery of any of said disks to be energized at a frequency proportional to the speed of said motor and the number of slots in the disk to which it is adjacent, a variable speed motor for driving the speed-responsive measuring instrument to be tested, means driven by said variable speed motor and controlled by said coil for indicating synchronization and non-synchronization of said variable speed motor with the coil frequency, and means for varying the speed of said variable speed motor.

4. A testing device for speed indicators comprising a plurality of magnetic disks, each having a different number of equally spaced radial slots therein, means for rotating said disks at a constant predetermined speed, an amplifier, a coil connected to said amplifier and movably mounted to be positioned adjacent the periphery of any of said disks to have induced therein a current having a frequency corresponding to the speed of said disks and the number of slots therein, a gas glow tube connected with said amplifier for energization thereby to flash at the frequency of the current induced in said coil, an indicating disk adjacent to said tube having indicia around its periphery to be illuminated by said tube, a variable speed motor for rotating said disk, means for connecting a speed indicator to be tested to said variable speed motor, and means for varying the speed of said motor to render the speed of rotation of said disk proportional to the frequency of the current induced in said coil as indicated by repeated illumination of the same indicium on said disk, whereby said disk appears to remain stationary.

5. A testing device for speed indicating instruments comprising a constant speed synchronous motor adapted to be energized from a source of alternating current of fixed frequency, a plurality of electrical impulse generating elements driven by said motor, a coil movable to position it adjacent to any of said impulse generating elements, said coil being adapted to have currents of different frequency induced therein by movement of an impulse generating element relative to said coil, a variable speed motor for driving the speed indicating instrument being tested, means for comparing the speed of said variable speed motor with the frequency generated in said coil, and means for determining whether said constant speed motor is synchronized with said alternating current comprising a rotary member driven by said synchronous motor and having indicia around its periphery, a glow tube for illuminating an indicium on said member adjacent to said tube, and means for energizing said tube to cause it to flash at a frequency corresponding to the speed at which said synchronous motor should operate.

DONALD R. PUTT.

REFERENCES CITED

The following references are of record in the file of this patent:

UNITED STATES PATENTS

| Number | Name | Date |
|---|---|---|
| 1,878,658 | Aronoff | Sept. 20, 1932 |
| 2,035,769 | Poole | Mar. 31, 1936 |
| 2,243,547 | Weisse | May 27, 1941 |
| 2,425,289 | Ward | Aug. 5, 1947 |